(No Model.)
A. L. TAYLOR.
CLUTCH.
No. 535,744. Patented Mar. 12, 1895.
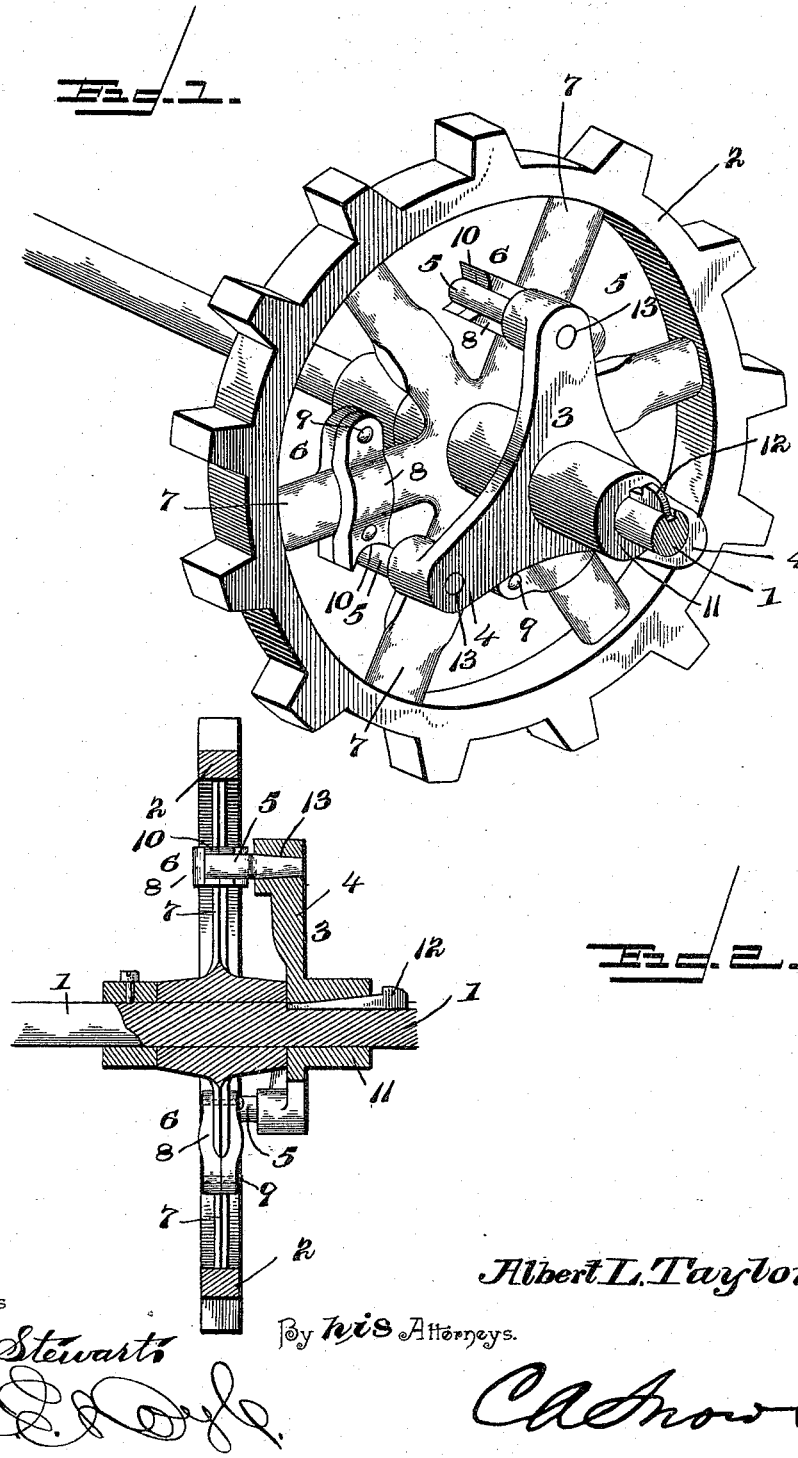
Witnesses
E. N. Stewart
Inventor
Albert L. Taylor
By his Attorneys.
C. A. Snow & Co.

UNITED STATES PATENT OFFICE.

ALBERT LAWRENCE TAYLOR, OF HARRISONBURG, VIRGINIA.

CLUTCH.

SPECIFICATION forming part of Letters Patent No. 535,744, dated March 12, 1895.

Application filed April 30, 1894. Serial No. 509,556. (No model.)

*To all whom it may concern:*

Be it known that I, ALBERT LAWRENCE TAYLOR, a citizen of the United States, residing at Harrisonburg, in the county of Rocking-ham and State of Virginia, have invented a new and useful Clutch, of which the following is a specification.

My invention relates to clutches for securing chain or sprocket-wheels, belt and other conveyer pulleys to shafting whereby power is communicated from the shafting, through the pulley to the chain or conveyer, and it has for its object to provide a clutch which will serve to lock the pulley to the shaft when the load carried by the chain or conveyer is within the limit of the safe strength of the chain or conveyer, and which will release the pulley when the load exceeds a certain predetermined point.
My improved clutch device is designed especially for use in connection with machinery used in tanning establishments where the gradual accumulations of tan-bark, after leaching, upon the conveyers, in addition to the corrosive action of the tannic acid, have the effect of straining the conveyers beyond their strength. When the conveyer breaks great damage is frequently done before the machinery can be stopped, and in the meantime the broken chain has become entangled with other parts of the machinery, thus causing a loss of time in addition to the expense due to the repairs. To overcome these disadvantages of a permanent attachment of the pulley to the shaft, I employ a clutch provided with parts or members which are displaceable and are preferably made of frangible material, whereby they maintain an effective connection between the shaft and the pulley while the load upon the chain remains below a certain limit but which break and release the pulley when the load exceeds this limit. It is also a disadvantage to have the pulley attached to the clutch by pins or links the ends of which remain secure to both pulley and clutch after they have been broken, and therefore it is my object to secure the pins in the clutch and project them sufficiently to bear against spokes or other permanent parts of the pulley, whereby when broken the loose or detached ends of the pins fall harmlessly from the pulley, thus saving the time of removing them. Furthermore, it is desirable to provide means for securing the pins to the clutch whereby after being broken the stumps, or ends attached to the clutch, may be removed with facility and without loss of time.

Further objects and advantages of the invention will appear in the following description, and the novel features thereof will be particularly pointed out in the claims.

In the drawings,—Figure 1 is a perspective view of a clutch embodying my invention, applied in the operative position to connect a pulley, in this case a chain-wheel, to a shaft. Fig. 2 is a vertical section of the same.

Similar numerals of reference indicate corresponding parts in all the figures of the drawings.

1 designates a shaft and 2 the pulley, which is loosely mounted on the shaft in any suitable or preferred manner; and adjacent to the pulley, and fixed to the shaft is the clutch member 3 having radial arms 4 bearing frangible pins 5, which are disposed to engage or bear without positive attachment against bearing-blocks 6 attached to the spokes 7 or against similar fixed parts of the pulley. If the pulley is not provided with spokes these blocks may be attached in any other similar manner or may be formed integral with the pulley. The bearing-blocks, in the construction illustrated in the drawings, consist of twin-cheeks 8, concaved upon their inner sides to fit the opposite surfaces of the spokes, and secured together at their extremities by means of bolts 9. The blocks are preferably concaved at their ends, as shown at 10, to receive the pins 5.

The hub 11 of the clutch member is secured to the shaft in any suitable manner, as by means of a key 12, and the pins 5, are tapered to fit in correspondingly tapered openings or sockets 13 in the outer ends of the radial arms 4.

By arranging the frangible pins to bear against, without attachment to, fixed parts of the pulley, it is obvious that when they break the detached ends which have been in contact with the wheel drop freely and do not require mechanical detachment, and the other ends of the pins, which are tapered and fit in tapered sockets 13 in the arms of the clutch member, may be unseated and thus removed from the clutch member by striking their outer reduced ends through the open outer ends of the sockets, said sockets being open at both inner and outer ends, as shown clearly in Fig. 2.

The pins may be made of cast-iron, wood, Babbitt metal, or any other brittle or frangible material, which will resist strain under a certain load but will yield when strained beyond a given limit, and the strength of the pins may be regulated by their size or cross-section to suit the strength of the chain or conveyer in use.

From the above description it will be understood that when the load upon the conveyer is in excess of the strength of the connecting pins the latter break and allow the conveyer to come to rest. The construction of the pins is such that they may be replaced at an inconsiderable expense.

Various changes in the form, proportion and the minor details of construction may be resorted to without departing from the spirit or sacrificing any of the advantages of this invention.

Having described my invention, I claim—

1. The combination, with a loose pulley, of a clutch member fixed to the shaft of the pulley and having spaced sockets, frangible pins seated in said sockets, and bearing blocks removably secured to the pulley in the paths of said pins and adapted to be engaged thereby to communicate motion from the fixed clutch member to the pulley, substantially as specified.

2. The combination, with a shaft, and a pulley loosely mounted upon the shaft and having radial spokes, of a clutch member fixed to the shaft and having radial arms terminating in sockets, bearing-blocks secured to the spokes of the pulley, and consisting of separable plates or members arranged in contact respectively with opposite sides of the spoke and secured together, and frangible-pins fitting removably in said terminal sockets and bearing against the faces of the bearing-blocks, substantially as specified.

In testimony that I claim the foregoing as my own I have hereto affixed my signature in the presence of two witnesses.

ALBERT LAWRENCE TAYLOR.

Witnesses:
GEO. N. CONRAD,
ED. S. CONRAD.